United States Patent
Frank

(10) Patent No.: US 9,758,965 B2
(45) Date of Patent: Sep. 12, 2017

(54) METHOD AND APPARATUS FOR CREASING FACING MATERIAL USED IN THE MANUFACTURE OF WALLBOARD

(71) Applicant: Georgia-Pacific Gypsum LLC, Atlanta, GA (US)

(72) Inventor: Chad A. Frank, Peachtree City, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 9 days.

(21) Appl. No.: 14/447,092

(22) Filed: Jul. 30, 2014

(65) Prior Publication Data

US 2014/0338592 A1    Nov. 20, 2014

Related U.S. Application Data

(62) Division of application No. 13/563,883, filed on Aug. 1, 2012, now Pat. No. 8,821,685, which is a division (Continued)

(51) Int. Cl.
*E04C 2/02* (2006.01)
*B32B 38/04* (2006.01)

(Continued)

(52) U.S. Cl.
CPC .................. *E04C 2/02* (2013.01); *B32B 3/04* (2013.01); *B32B 5/26* (2013.01); *B32B 7/12* (2013.01); *B32B 13/08* (2013.01); *B32B 13/14* (2013.01); *B32B 17/02* (2013.01); *B32B 38/04* (2013.01); *C04B 28/14* (2013.01); *E04C 2/043* (2013.01); *B32B 2038/047* (2013.01); *B32B 2262/101* (2013.01); *B32B 2307/7265* (2013.01); *B32B 2607/00* (2013.01); *Y10T 428/2419* (2015.01);

(Continued)

(58) Field of Classification Search
CPC ..... Y10T 428/24215; Y10T 428/24446; Y10T 428/2419; Y10T 428/24198; B32B 3/04; B32B 2038/047; B32B 38/04
USPC ............................. 156/347, 348; 118/32, 35
See application file for complete search history.

(56) References Cited

U.S. PATENT DOCUMENTS

| | | | | |
|---|---|---|---|---|
| 4,141,544 A | * | 2/1979 | Birkenmayer | .......... B41F 13/58 493/355 |
| 5,306,539 A | * | 4/1994 | Clarke | ................... B27N 3/143 428/134 |

(Continued)

*Primary Examiner* — Philip Tucker
*Assistant Examiner* — Jimmy R Smith, Jr.
(74) *Attorney, Agent, or Firm* — Ram W. Sabnis

(57) ABSTRACT

Aspects of this disclosure relate to a method of manufacturing wallboard which includes providing a first layer of facing material, creasing the first layer facing material intermittently to create a series of creased portions, providing a gypsum slurry on the first layer of facing material and providing a second layer of facing material over the gypsum slurry. Further, creasing the first layer of facing material intermittently can include intermittently creasing the first layer of facing material in a substantially linear fashion extending in a first direction of the first layer of facing material so that the first layer of facing material exhibits a linear series of creased portions extending in the first direction of the first layer of facing material and a series of portions that are not creased extending in the first direction of the first layer of facing material.

20 Claims, 13 Drawing Sheets

Related U.S. Application Data of application No. 12/267,375, filed on Nov. 7, 2008, now Pat. No. 8,257,524.

(51) Int. Cl.
*B32B 3/04* (2006.01)
*B32B 5/26* (2006.01)
*B32B 17/02* (2006.01)
*E04C 2/04* (2006.01)
*C04B 28/14* (2006.01)
*B32B 7/12* (2006.01)
*B32B 13/08* (2006.01)
*B32B 13/14* (2006.01)

(52) U.S. Cl.
CPC ................. *Y10T 428/24215* (2015.01); *Y10T 428/24446* (2015.01)

(56) References Cited

U.S. PATENT DOCUMENTS

| | | | | |
|---|---|---|---|---|
| 6,035,753 A | * | 3/2000 | Coffey | B26F 1/18 83/332 |
| 6,162,155 A | * | 12/2000 | Gordon | B31B 1/25 493/365 |
| 2002/0187298 A1 | * | 12/2002 | Hauber | B28B 11/0845 428/70 |
| 2005/0039582 A1 | * | 2/2005 | McCluskey | B26F 1/20 83/13 |
| 2006/0229184 A1 | * | 10/2006 | Powell | B31F 1/10 493/467 |

\* cited by examiner

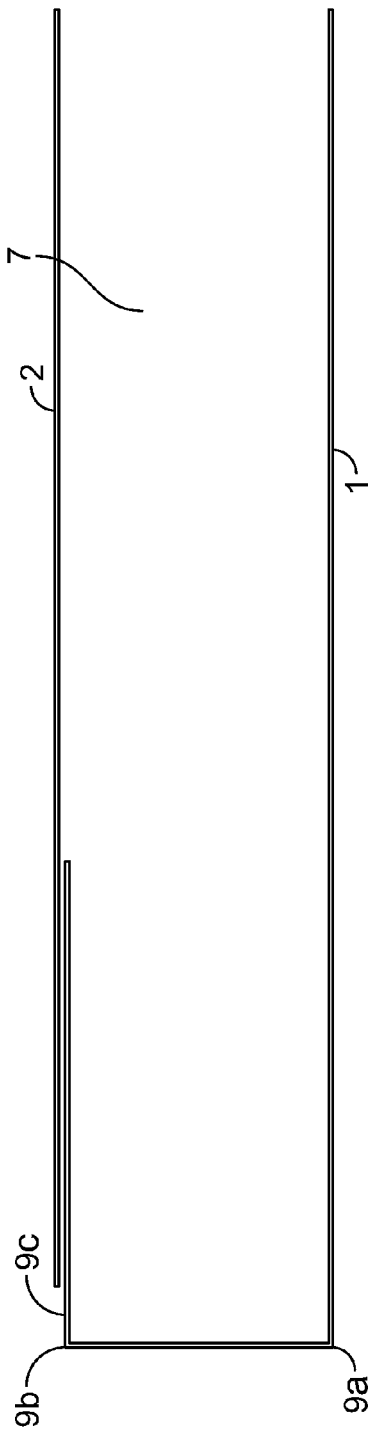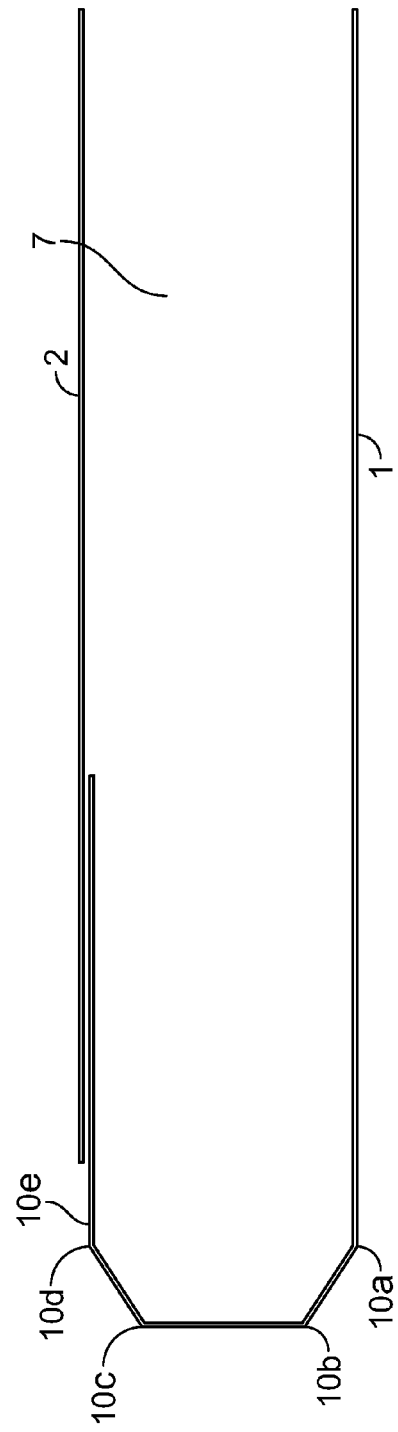

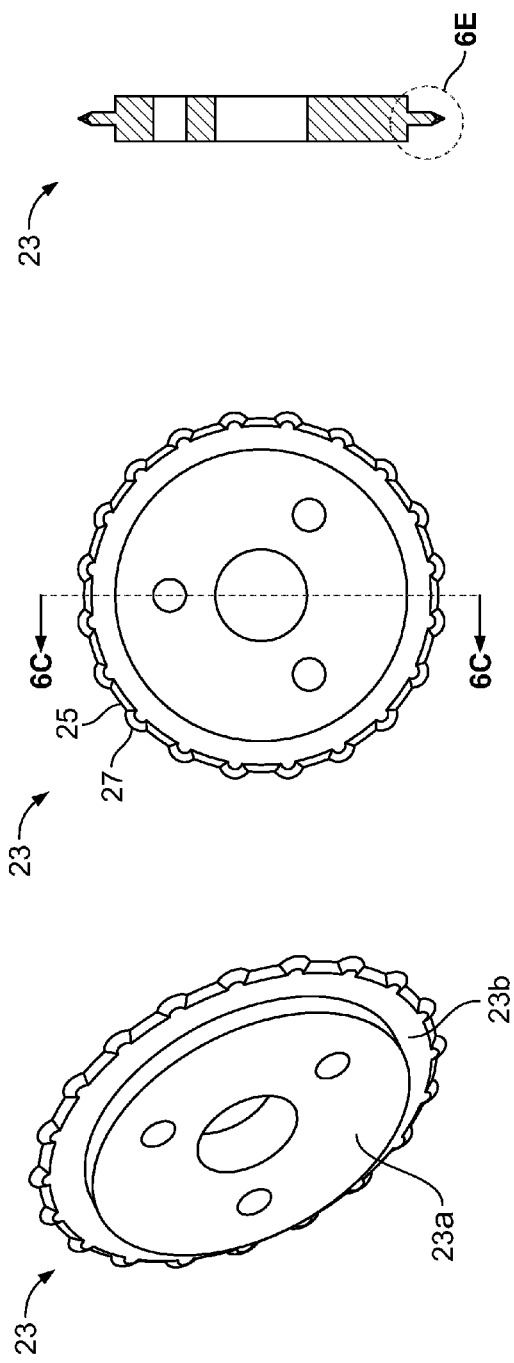

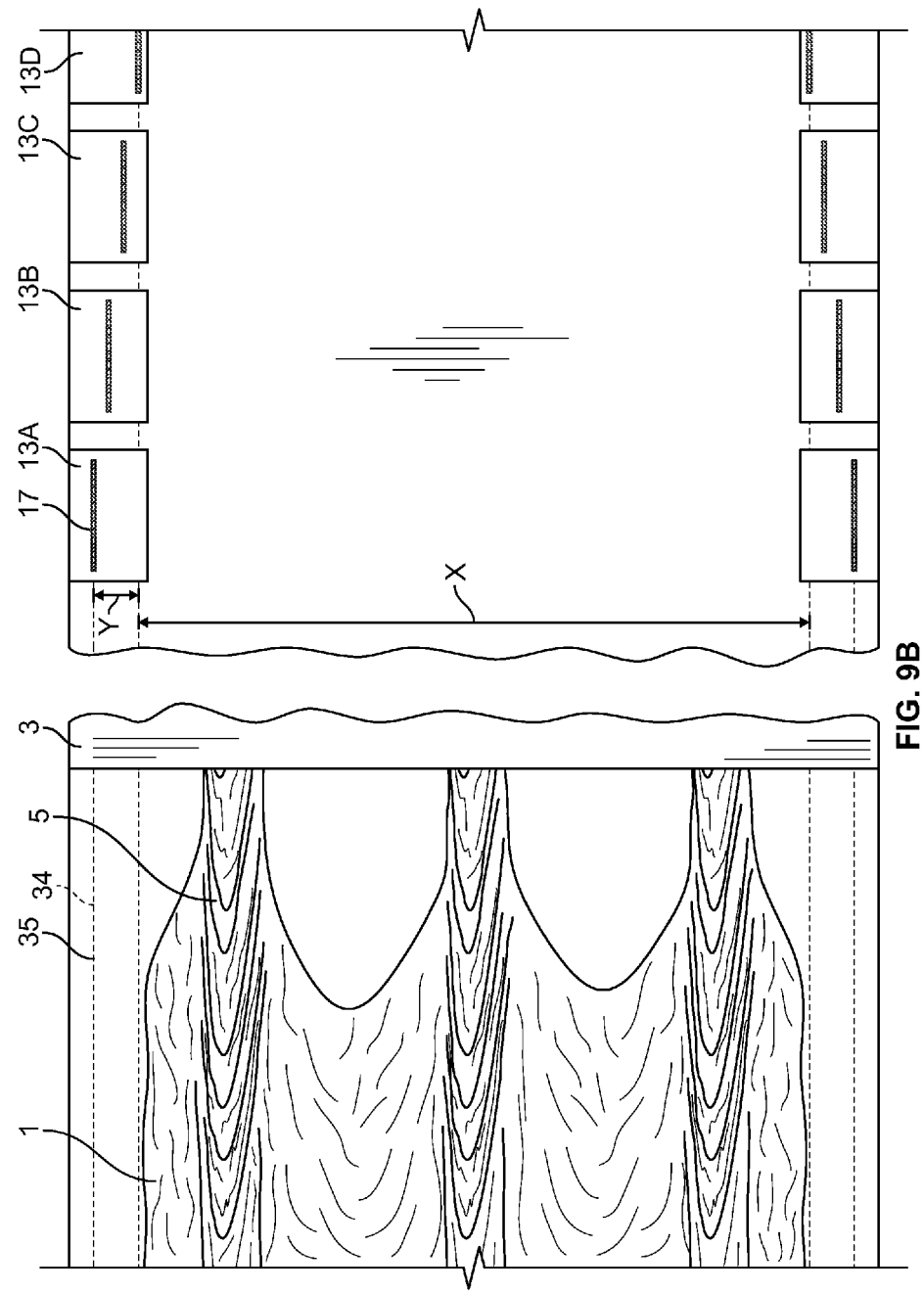

METHOD AND APPARATUS FOR CREASING FACING MATERIAL USED IN THE MANUFACTURE OF WALLBOARD

CROSS-REFERENCE TO RELATED APPLICATIONS

This application is a divisional of U.S. patent application Ser. No. 13/563,883, filed on Aug. 1, 2012, which is a divisional of U.S. patent application Ser. No. 12/267,375, filed on Nov. 7, 2008, each of which is hereby incorporated by reference in its entirety.

FIELD OF THE DISCLOSURE

Aspects of the present disclosure generally relate to manufacturing of wallboard. Particular aspects of the present disclosure relate to the creasing of facing material used in wallboard manufacturing process.

BACKGROUND

Wallboard is a manufactured building material that is used in the construction of walls or ceilings. Wallboard is also known as plasterboard, drywall and gypsum board. In a conventional process for creating wallboard, the wallboard is manufactured from a gypsum slurry. The gypsum slurry material is fed on a sheet of facing material at the "wet end" of a wallboard line and then as the gypsum slurry material travels down the line, a second sheet of facing material is placed on top of the slurry material to form the wallboard. The wallboard hardens through a chemical reaction. The resulting wallboard is a long continuous slab which is cut via a knife into separate lengths. The resulting lengths are sent through driers which drive excess water out of the gypsum. Crystals of gypsum, and other additives, migrate into the facing sheet to create a tight bond. Once the wallboard has been dried, it may be "booked" together by a "booker" wherein two lengths of wallboard are brought together, facing material to facing material, in order to protect the inner or finished surfaces of the wallboard. Thereafter, the "booked" wallboard may be transferred to a wallboard bundler. The wallboard bundler squares and aligns the wallboard in order to trim the wallboard to a precise length and tape the ends of the wall board. After the wallboards have left the bundler they may be sent to a stacker which aligns the bundles of wallboard and stacks them on top of each other to be transferred to a storage location.

In the above described process, the facing material onto which the slurry is fed may be creased and folded to create the long edges of the wallboard. However, conventional creasing equipment and processes can cut through or at least weaken the facing material. For example, conventional creasing equipment and processes can create weak points in the edge of the wallboard where the edge of the wallboard can separate and pull away from the core of the wallboard. This will have negative effects on both the quality and the aesthetics of the wallboard. Therefore, it would be desirable to crease the facing material in a manner that reduces or eliminates the cutting through or weakening of the facing material.

SUMMARY

The present disclosure generally relates to methods and an apparatus for creasing the facing material used in manufacturing wallboard.

Aspects of this disclosure relate to a method of manufacturing wallboard which includes providing a first layer of facing material, creasing the first layer facing material intermittently to create a series of creased portions, providing a gypsum slurry on the first layer of facing material and providing a second layer of facing material over the gypsum slurry. Further, creasing the first layer of facing material intermittently can include intermittently creasing the first layer of facing material in a substantially linear fashion extending in a first direction of the first layer of facing material so that the first layer of facing material exhibits a linear series of creased portions extending in the first direction of the first layer of facing material and a series of portions that are not creased extending in the first direction of the first layer of facing material.

Additional aspects of this disclosure relate to an apparatus for manufacturing wallboard which includes a feeder that feeds a first layer of facing material, a first set of one or more creaser wheels positioned on a first side of the first layer of facing material, a second set of one or more creaser wheels positioned on a second side of the first layer of facing material and a feeding source that feeds a gypsum slurry on the first layer of facing material. Further, each of the creaser wheels includes a series of notches and teeth. Additionally, each creaser wheel creases the first layer of facing material by creasing portions the first layer of facing material and refraining from creasing other portions of first layer facing material so that the uncreased portions of the first layer of facing material are positioned in line with the creased portions of the facing material and between the creased portions of facing material.

Additional aspects of this disclosure relate to a method of preparing a facing material for use in the manufacturing of wallboard which includes providing a facing material, creasing the facing material by applying a first set of one or more creaser wheels positioned on a first side of the facing material and a second set of one or more creaser wheels positioned on a second side of the facing material and folding the creased facing material to create the edge of the wallboard. Further, each of the creaser wheels has notches and teeth and is applied to the facing material in a rotational manner so that the facing material is creased in intervals so that the facing material exhibits creased portions and uncreased portions in line with the creased portions between the creased portions. Additionally, each of the creaser wheels in the first set of creaser wheels are offset from one another in a width direction of the facing material, so that the first set of creaser wheels creates a first set of parallel rows of creased portions and uncreased portions extending in a direction along a length of the facing material and each of the creaser wheels in the second set of creaser wheels are offset from one another in a width direction of the facing material, so that the second set of creaser wheels creates a second set of parallel rows of creased portions and uncreased portions extending in a direction along a length of the facing material.

The above summary presents general aspects of the disclosure in order to provide a basic understanding of at least some of its aspects. The summary is not intended as an extensive overview of the disclosure. It is not intended to identify key or critical elements of the disclosure or to delineate the scope of the disclosure. The above summary merely presents some concepts of the disclosure in a general form as a prelude to the more detailed description provided below.

BRIEF DESCRIPTION OF THE DRAWINGS

A more complete understanding of the present disclosure and certain advantages thereof may be acquired by referring to the following description in consideration with the accompanying drawings, in which like reference numbers indicate like features, and wherein:

FIG. 2A is a profile view of a wallboard with a rectangular edge;

FIG. 2B is a profile view of a wallboard with a beveled edge;

FIG. 6A is an illustrative embodiment of a creaser wheel according to an aspect of the present disclosure;

FIG. 6B is another view of the creaser wheel illustrated in FIG. 6A;

FIG. 6C is a sectional view of the creaser wheel illustrated in FIG. 6A;

FIG. 6D is a top view of the creaser wheel illustrated in FIG. 6A;

FIG. 6E is an enlarged view of a section of the creaser wheel illustrated in FIG. 6C;

FIG. 9B is an illustrative embodiment of a facing material during a process for manufacturing wallboard where the facing material has been creased according to aspects of this disclosure.

DETAILED DESCRIPTION

In the following description of various example embodiments of the disclosure, reference is made to the accompanying drawings, which form a part hereof, and in which are shown by way of illustration various example structures and systems in which aspects of the disclosure may be practiced. It is to be understood that other specific arrangements of parts, structures, example devices, systems, and the like may be utilized and structural and functional modifications may be made without departing from the scope of the present disclosure.

Figure 1:
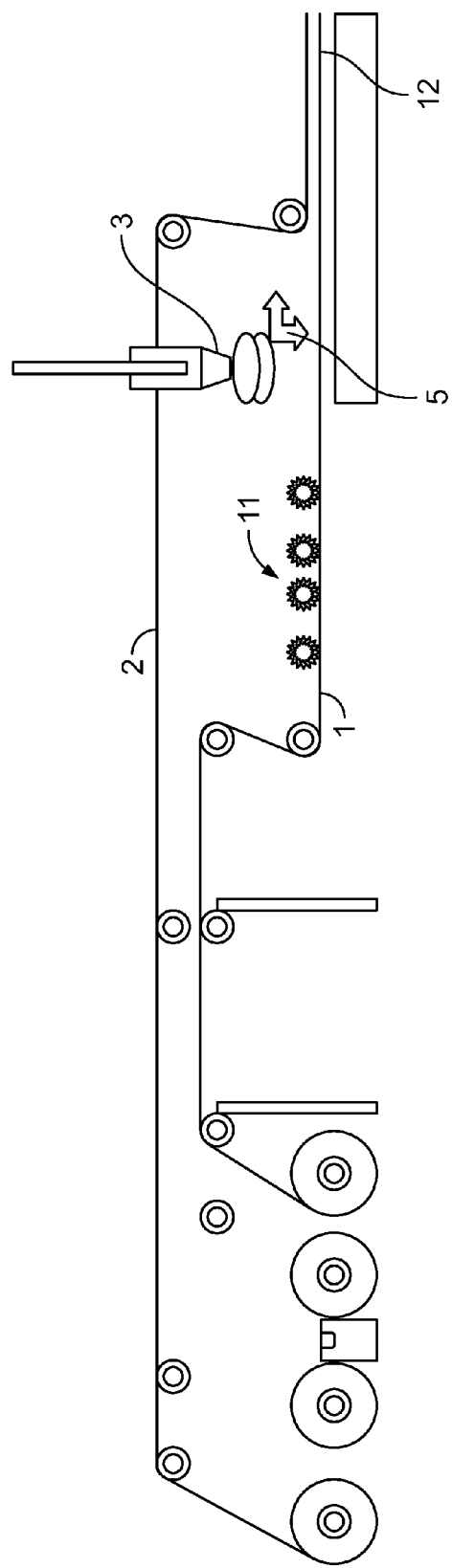
FIG. 1 is a schematic diagram illustrating a process for manufacturing wallboard.

FIG. 1 is a schematic diagram which shows an illustrative embodiment of a portion of a process for creating wallboard wherein a first layer a facing material sheet 1 is being conveyed down a conveying line. The facing material may be paper, fiberglass (e.g., a fiberglass mat, a coated fiberglass mat), etc. Each material that can be used as facing material will have its own particular advantages. For example, when a multiply Kraft paper (e.g., a heavy paper) is used as the facing material, it has the advantage of being relatively inexpensive compared to other materials that could be employed as facing material. Alternatively, when a fiberglass mat is used as facing material, especially a coated fiber glass mat, for example, as described in U.S. Pat. No. 6,808,793, it has advantage of being moisture resistant and mold resistant. Therefore, wallboard constructed with a fiberglass mat as the facing material has a greater resistance to moisture and mold, particularly a coated fiberglass mat, as compared with wallboard constructed with paper as the facing material. Regardless of what particular material is used as the facing material, the process of creating the wallboard will remain relatively unchanged.

As shown in FIG. 1, the facing material 1 is fed as a long, continuous sheet on which the gypsum slurry is placed. A mixer (not shown) prepares a gypsum slurry material and transmits it to a feed source, such as a slurry boot 3. At the slurry boot 3, the gypsum slurry 5 is distributed onto the facing material sheet 1. In some cases, the slurry boot 3 may contain one or more outlets which distribute the gypsum slurry more evenly across the width of the facing material 1. As seen in FIG. 1, a second layer of facing material sheet 2, in other words, a top or back layer of facing material, is also conveyed down the conveying line so that after the gypsum slurry 5 is applied onto the facing material sheet 1 at the slurry boot 3, the top facing material sheet 2 is placed on top of the gypsum slurry 5 and the facing material sheet 1 in order to form the top side face of the wallboard 7. This process of attaching the second layer of facing material 2 takes place at a forming station 12 which is positioned downstream of a slurry boot 3 as shown in FIG. 1. After the forming station 12, the first layer of facing material 1, the gypsum slurry 5 and the second layer of facing material 2, can be put through a dryer station wherein the first layer of facing material 1, the gypsum slurry 5 and the second layer of facing material 2 are dried.

The facing material 1 can be folded in order to create the edges of the wallboard 7. For example, the ends of the facing material 1 can be folded upwards and inwards to create a "pocket" which will hold the gypsum slurry 5 within the facing material sheet 1. For example, FIG. 2A shows a profile view of a particular embodiment of a wallboard product 7. As seen in FIG. 2A, the ends of the facing material sheet 1 are folded twice to create the "pocket". Specifically, the facing material sheet 1 is folded at a first position 9A and at a second position 9B to create the edge of the wallboard 7. As seen in FIG. 2A, the folds can be approximately 90° so that the wallboard 7 has a rectangular edge. Further, as seen in FIG. 2A the facing material sheet 1 is folded so that a flap 9C is created which forms the top end of the "pocket". Also, this flap 9C provides a place for the top facing material sheet 2 to be attached to the facing material sheet 1. For example, an adhesive, such as glue, can be applied to between the two sheets and then the top facing material sheet 2 can be applied. In this way, the top facing material sheet 2 will form a top side face of the wallboard 7.

FIG. 2B shows an alternative embodiment wherein the facing sheet material 1 is folded four times. Specifically, the facing material sheet 1 is folded at a first position 10A, a second position 10B, a third position 10C, and a fourth position 10D in order to create the edge of the wallboard 7.

As seen the folds are angled so that the wallboard 7 has a beveled edge. This wallboard 7 with a beveled edge may be used in particular applications of the wallboard 7 wherein wallboard with a beveled edge is preferred over wallboard with a rectangular edge. For example, the beveled edges allow the wallboard to be hung between two metal channels. Therefore, the beveled edged wallboard could be used to line elevator shafts or in other environments wherein the ability of the wallboard to be hung between two metal channels would be relevant. Again, just as with the above described embodiment, a flap 10E may be employed, because it provides a place for the top facing material sheet 2 to be attached to the facing material sheet 1. As seen in FIG. 2B, an adhesive, such as glue, can be applied to between the two sheets and then the top facing material sheet 2 can be applied. In this way, the top facing material sheet 2 will form a top side face of the wallboard 7.

It is noted, that these illustrative embodiments are just examples of the types of wallboard 7 that can be produced and, of course, other types of wallboard 7 are contemplated. For example, other folds such as a triple fold, folds with different angles, etc. could be employed without departing from the scope of this disclosure.

The folding of the facing material takes place prior to the facing material entering the forming station 12. For example, after the gypsum slurry is applied to the facing material 1, the width ends of the conveying line are configured to fold the facing material 1 upwards. For example, the conveying line may contain upstanding rails that guide and fold the ends of the facing material 1. Further, just prior to entering the forming station 12, the conveying line can be configured to fold the ends of the facing material over in a manner as described above. For example, the conveying line can be configured to fold the facing material 1 approximately 90° at a first position 9A and again 90° at a second position 9B to create the rectangular edge of the wallboard seen in FIG. 2A. Once the facing material 1 has been folded, the forming station 12 attaches the top facing material sheet 2 to the facing material 1. For example, the forming station 12 may apply an adhesive such as glue between facing material 1 and top facing material sheet 2 in order to attach the first and second layers of facing material 1, 2.

In order to facilitate the above described folding of the facing material 1, the facing material 1 may be creased or scored prior the facing material 1 being folded along the conveying line. In other words, once the facing material 1 has been creased, it can be folded along the crease. For example, as seen in FIG. 1, a creasing area 11 may be positioned on the conveying line so that facing material sheet 1 is creased prior to the gypsum slurry 5 being distributed onto the facing material sheet 1 at a slurry boot 3. Further, as seen in FIG. 1, the creasing area 11 can include one or more creaser wheels (although it is noted that other creasing apparatus may be used as well). As the facing material 1 travels down the conveying line and through the creaser area 11, the creaser wheels create rows of creases in the facing material sheet 1.

Figure 3A:
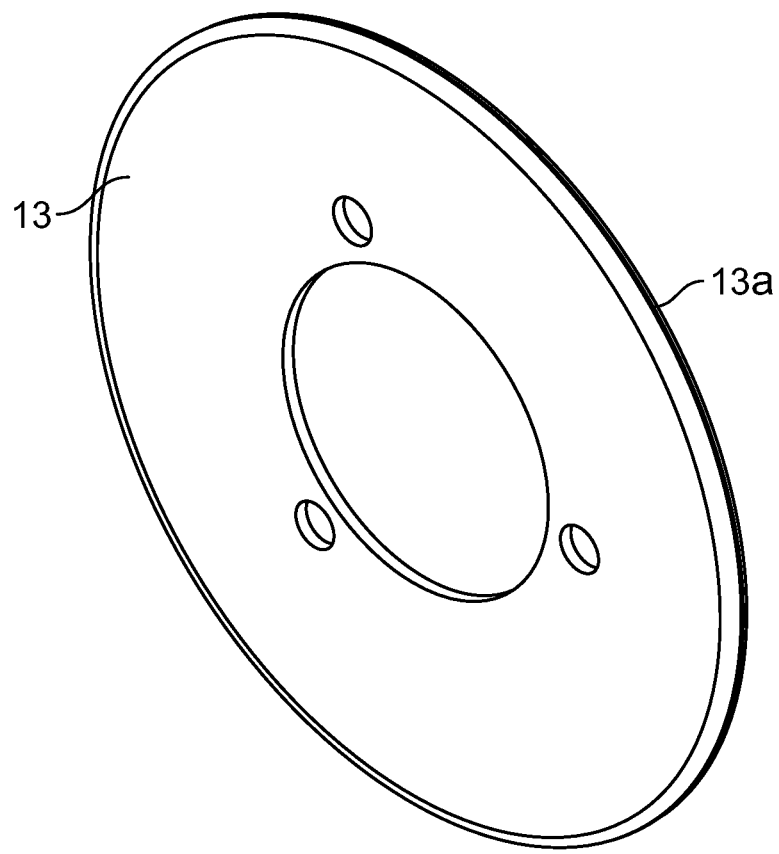
FIG. 3A illustrates a conventional creaser wheel.
Figure 3B:
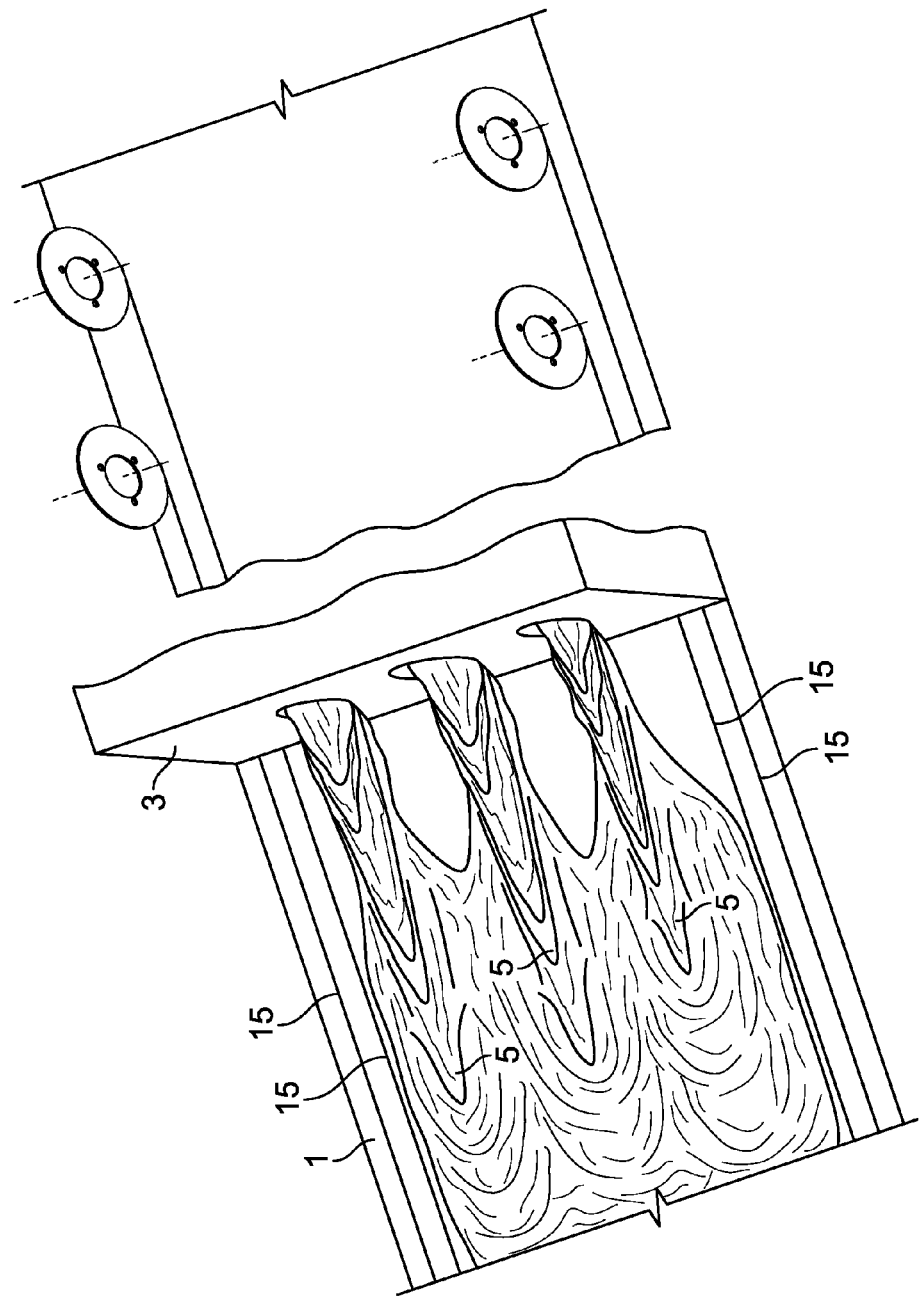
FIG. 3B illustrates a facing material during a process for manufacturing wallboard where the facing material has been creased with conventional creaser wheels.

Conventional creaser wheels will impart a continuous crease or score line along the facing material. For example, FIG. 3A shows a conventional creaser wheel 13 that would be used in the creasing process. As seen in FIG. 3A, the conventional creaser wheel 13 has an approximately uniform circumference 13A. Therefore, when applied to the facing material 1, the conventional creaser wheel 13 will impart a continuous crease into the facing material. FIG. 3B illustrates such a situation wherein the conventional creaser wheels with approximately uniform circumferences have made row of continuous creases or score lines 15 in the facing material 1.

While the creases created by a creasing process allow the facing material 1 to fold more readily, the creases can also have detrimental effects on the facing material 1. First, the facing material 1 may be weakened along a crease. The amount that the facing material 1 is weakened may depend on what material is used as the facing material. For example, as discussed above, a fiberglass mat or a pre-coated fiberglass mat can be used as the facing material. However, when the fiberglass mat is creased, the fibers in the creased area usually are not smoothly bent or creased. Instead, the fibers in the creased area of the fiberglass mat are often crushed and broken. Therefore, the creasing process can actually cut-through, or sever, the facing material 1. This is detrimental to the wallboard product 7, because the portion of the fiberglass mat that comprises the edge of the wallboard product 7 may separate from the core of the wallboard product 7. As will be discussed in detail below, this reduces the quality and aesthetics of the wallboard product 7.

Alternatively, even if the fibers of the fiberglass mat are not actually cut-through or severed during the creasing process, the prior art creasing process will in most cases, at least, weaken the fibers. This weakening of the fibers can still cause the portion of the fiberglass mat that comprises the edge of the wallboard to separate from the core of the wallboard, because when the weakened fibers at the creased area are further stressed they may break or separate from the rest of the fiberglass mat. In other words, the weakened fibers may still be intact immediately after the creasing process, but may break or separate from the rest of the fiberglass mat at a later time. For example, the fibers may break or separate during the folding process where the fibers are further stressed or during or after the drying process wherein the wallboard contracts as it dries. Similarly, the processes of booking, stacking, bundling, transporting or even installing the wallboard can all cause stress at the edges of the wallboard and, therefore, these processes may cause the weakened fibers to break or separate from the rest of the fiberglass mat. Therefore, unfortunately, such damage is not usually apparent until after the wallboard product is complete.

Figure 4A:
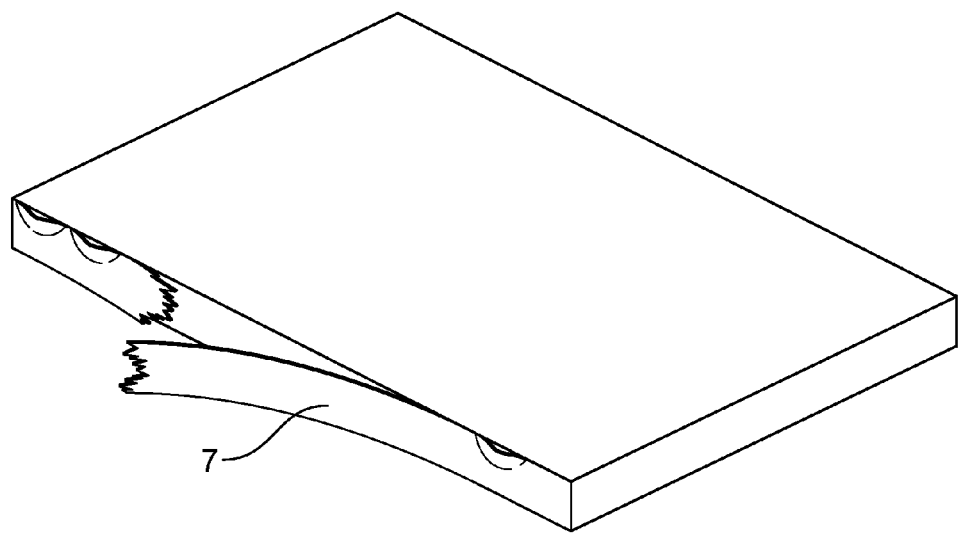
FIG. 4A illustrates a wallboard product wherein the edge has separated from the core of the wallboard.
Figure 4B:
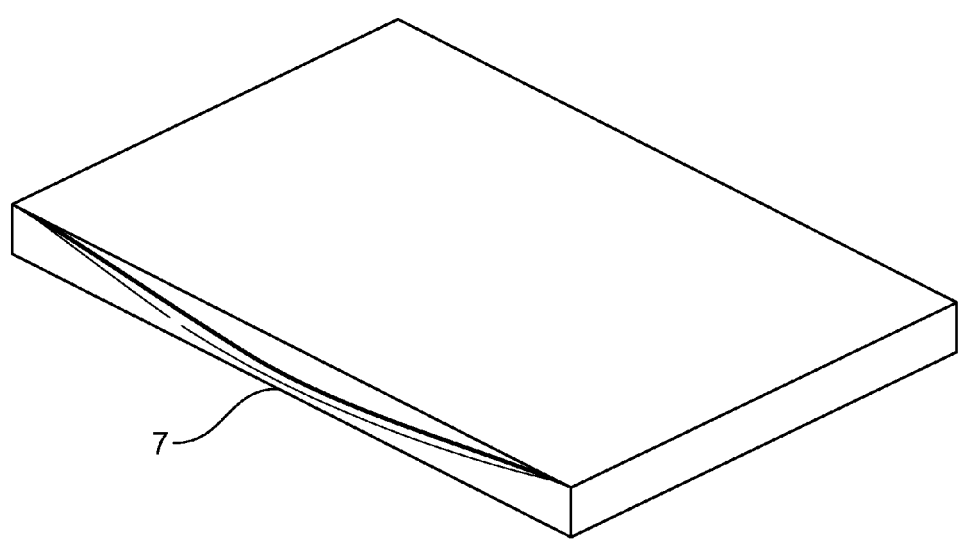
FIG. 4B illustrates a wallboard product wherein the edge has separated from the core of the wallboard.

When the weakened fibers at the creased areas break or separate from the rest of the fiberglass mat, the portion of the fiberglass mat that comprises the edge of the wallboard separates (i.e., "pops open") from the core of the wallboard. When this happens, the aesthetic appearance and quality of the wallboard product 7 is reduced. FIGS. 4A and B show examples of where the edge of the wallboard 7 has separated (i.e., popped open) from the core of the wallboard 7. In the industry, these products are generally considered unsellable. For example, when a consumer is selecting and purchasing wallboard, they will likely select and purchase wallboard that has the edges intact over wallboard that does not.

Therefore, for the reasons discussed, the conventional creasing process has drawbacks, particularly for wallboard made with facing material comprising a fiberglass mat and coated fiberglass mat. Further, the conventional creasing processes, such as the conventional creasing wheels discussed above, will impart a continuous crease to the facing material which weakens the facing material throughout the entirety of continuous, creased area of the facing material. The Applicant has determined that such a continuous crease is not needed, because the folding of the facing material can still be accomplished without creasing the facing material in a continuous manner over entirety of the facing material.

Instead, the Applicant has realized that it is possible to crease the facing material in a way that the folding of the facing material is still facilitated, but yet reduces the extent that the facing material is weakened by the creasing process.

Hence, aspects of this disclosure are directed to a method of creasing facing material that reduces the weakness in the facing material due to the creasing process. In other words, the facing material is stronger along the creased portion of the facing material compared to facing material which has been creased by conventional methods. As a result, the Applicant's method of creasing the facing material reduces or eliminates the chance that the portion of the facing material which comprises the edge of the wallboard will separate from the core of the wallboard. This method thus results in an improved wallboard product. Therefore, both the quality of the wallboard and its aesthetics are preserved.

According to one aspect of this disclosure, a method of creasing the facing material includes creasing or scoring the facing material intermittently. In other words, the facing material is creased or scored in intervals, rather than making a continuous crease or score line in the facing material. For example, aspects of the disclosure relate to creasing the facing material intermittently in a substantially linear fashion in a first direction (e.g. along the length) of the facing material so that the facing material has a linear series of creased portions extending in the first direction along the length of the facing material and a series of portions that are not creased extending in direction along the length of the facing material.

According to some aspects of this disclosure, the creased and "uncreased" sections may alternate linearly along the length of the facing material such that the creased portions are separated from each other by the portions that are not creased. In other words, the method may include creasing a first section of the facing material, refraining from creasing a second section of the facing material adjacent the first section of the facing material, creasing a third section of the facing material adjacent the second section of the facing material, etc. For example, the method may include producing facing material that has creased portions separated from each other by gaps of uncreased facing material. In this way, uncreased portions of the facing material are positioned in line with the creased portions of the facing material and between the creased portions of facing material.

By creasing only some portions of the facing material along a line, instead of the entirety of the facing material along the line, the facing material retains its strength in those portions of the facing material that are not creased, because the fibers in those sections have not been stressed by the creasing process. Therefore, more of the overall strength of the facing material is better retained, but the facing material is still able to be readily folded.

This method of intermittently creasing the facing material will reduce or eliminate the issue of cutting-through or weakening of the facing material. Therefore, separation of the facing material which comprises the edge of the wallboard from the core of the wallboard will be reduced. Hence, through this method both the aesthetics and the quality of the wallboard are preserved. As a result, materials, time and effort used in manufacturing the wallboard are conserved and waste, in the form of unsellable wallboard product, is reduced.

According to some aspects of this disclosure, the facing material is creased intermittently in a series of parallel rows extending in a direction along a length of the first layer of facing material. For example, as will be described in more detail below, creasing the facing material intermittently may include creasing the facing material intermittently on a first side of the facing material in order to create a first series of parallel rows on a first side of the facing material and also creasing the facing material intermittently on a second side of the facing material in order to create a second series of parallel rows on a second side of the facing material.

Further, according to some embodiments of the disclosure, the length of the creased portions may be uniform and similarly, the length of the uncreased portions can also be uniform. In other words, in some embodiments, the length of the creased portions may be ½ inch and the length of the uncreased portions may be ⅛ inch. Of course the length of the creased portions and the length of the uncreased portions can be equal. For example, the creased portion may be ½ inch while the uncreased portions are also ½ inch. However, it is noted, that neither the length of the creased portions, nor the length of the uncreased portions has to be uniform. For example, in some embodiments the length of the creased portions may change from ¼ inch in some areas to ½ inch in other areas and similarly the length of the uncreased portions may also change. Additionally, it is noted changes in the length of the creased portions do not have to correspond to similar changes in length of the uncreased portions. For example, in some embodiments the creased portions may change from ¼ inch in some areas to ½ inch in other areas, while the length of the uncreased portions stays constant at ⅛ inch or varies between ⅛ inch and 1/16 inch. While the particular dimension of the creased and uncreased portions may change, as long as the sequencing and lengths of the creased portions and uncreased portions allow the facing material to be readily folded and also retains the strength of the facing material 1 along the line, the lengths and the sequencing are considered within the scope of the disclosure. For example, the length of the creased portions and uncreased portions can be 1/32 inch, 1/64 inch, 1/16 inch, 3/32 inch, ⅛ inch, 5/32 inch, 3/16 inch, 7/32 inch, ¼ inch, etc.

According to some aspects of this disclosure, along a row of creased portions and portions that are not creased, the percentage of the row that is creased is at least 50% of the row. In this way, at least half of the row is creased while the remaining portion or the row is not creased. It is noted that is percentage is merely an example and other percentages are contemplated. For example, along a row of creased portions and portions that are not creased, the percentage of the row that is creased (i.e., the creased portions) could be approximately: 70%, 80%, or 90%. Alternatively, the percentage of the row that is creased could be less than 50% (e.g., 30%). It is noted these are merely examples and other percentages are contemplated. As long the as the percentages of creased portions compared with the percentage of portions that are not creased allows the facing material to be readily folded while not significantly degrading the strength of the facing material in the creased portion, as encountered in the prior art, the ratios and percentages are considered within the scope of the disclosure.

Further, it is noted, along a row of creased portions and portions that are not creased, the ratio of the number of creased portions and the number of portions that are not creased can be 1:1. For example, if a crease is made, then an uncreased portion is also made. Thus, if a crease with a length of ¼ inch is made in the facing material, it could be followed by an uncreased portion of the same length of ¼ inch. In other words, the lengths of the individual creased portions and the lengths of the individual portions that are not creased may be approximately equal.

The method of intermittently creasing the facing material can be accomplished in a variety of ways. For example, a rotating means, such as a creaser wheel or scoring wheel, may be used to intermittently crease the facing material. Similarly, a reciprocating means, such as a reciprocating stamping mechanism may be used to intermittently crease the facing material. Similarly, a track means, such as a creasing means that moves like a belt or tank tread, can be applied to the facing material to intermittently crease the facing material As long the facing material is intermittently creased, the actual means or mechanism for creasing the facing material is considered within the scope of the disclosure.

Figure 5A:
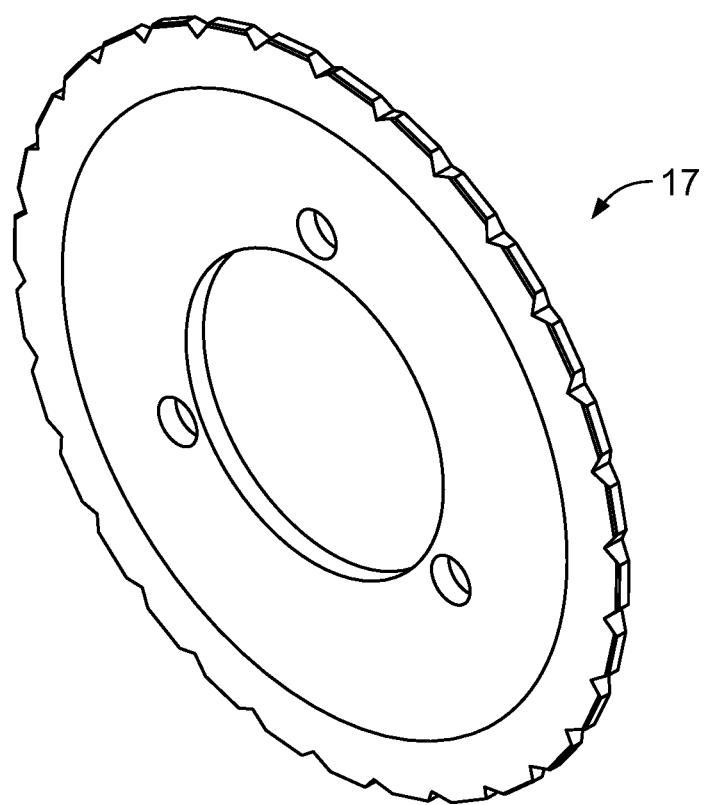
FIG. 5A is an illustrative embodiment of a creaser wheel according to an aspect of the present disclosure.
Figure 5B:
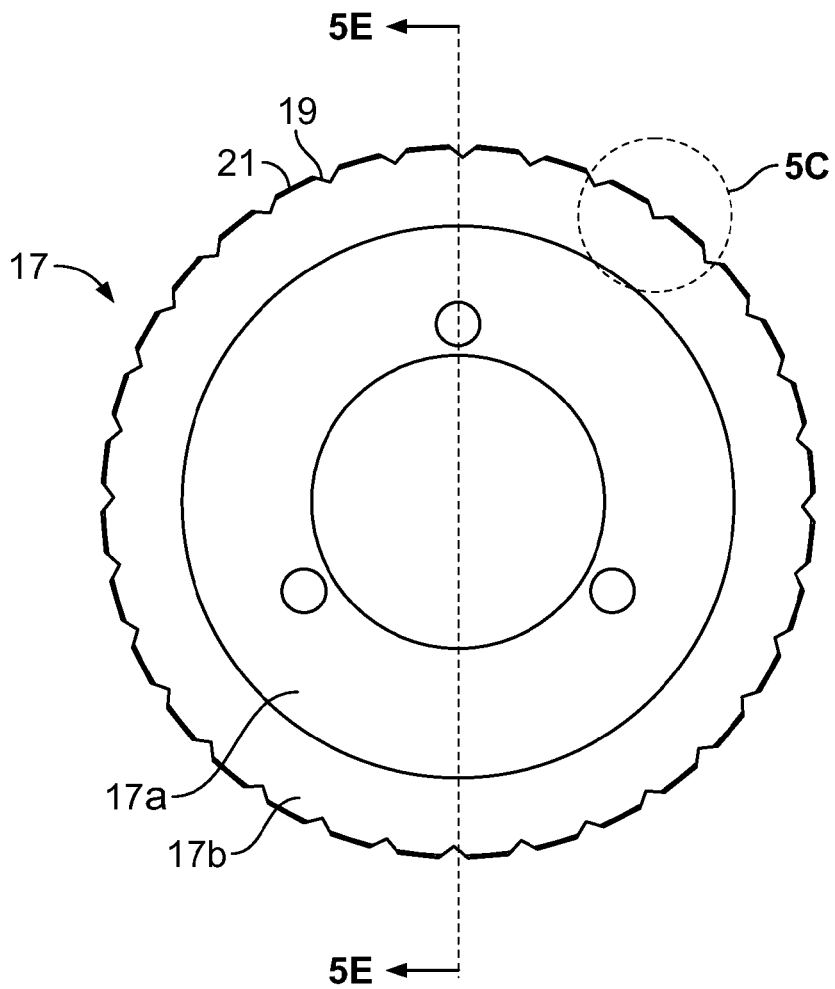
FIG. 5B is another view of the creaser wheel illustrated in FIG. 5A.
Figure 5C:
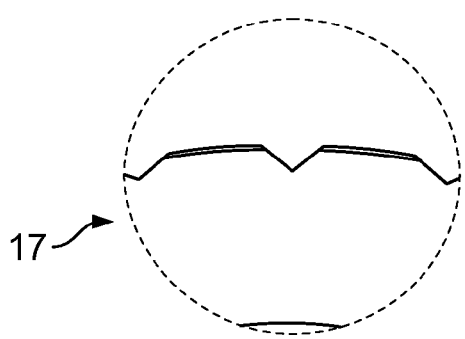
FIG. 5C is an enlarged view of a section of the creaser wheel illustrated in FIG. 5A.

According to one aspect of this disclosure, the method of intermittently creasing the facing material includes a rotating creaser apparatus. For example, the method of intermittently creasing the facing material may include one or more creaser wheels. An illustrative embodiment of a creaser wheel according to one aspect of the disclosure is shown at FIGS. 5A and 5B. As shown in FIGS. 5A and 5B, the illustrative creaser wheel 17 is a disc with a circumference. In the depicted embodiment, the circumference includes notches 19 which define teeth 21. In the depicted embodiment, the notches 19 have angled shape in a direction towards the center of the wheel 17 which define the teeth 21. FIG. 5C is an enlarged view of the notches 19 which show that in the depicted embodiment, the angle of the notches is approximately 120°. However, this configuration is merely an illustrative embodiment and other shapes and angles could be employed without departing from the scope of the disclosure.

Figure 5D:
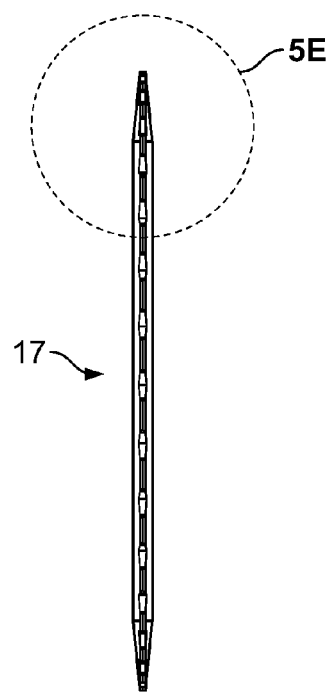
FIG. 5D is a end view of the creaser wheel illustrated in FIG. 5A.
Figure 5E:
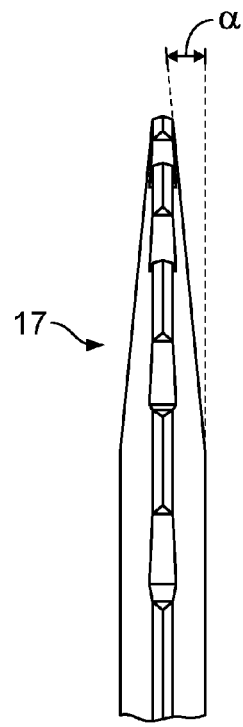
FIG. 5E is a sectional view of the creaser wheel illustrated in FIG. 5A.

FIG. 5D is an end view of the creaser wheel illustrated in FIG. 5A. As seen in FIG. 5D, the thickness of the creaser wheel 17 can remain relatively uniform throughout the wheel until the thickness of the creaser wheel begins to taper to a point near the circumference of the creaser wheel 17. For example, FIG. 5E is a sectional view of the creaser wheel illustrated in FIGS. 5A and B. As can be seen in FIG. 5E, the taper ($\alpha$) can be approximately 6°.

According to some aspects of the disclosure, the creaser wheel 17 may include an inner portion 17A and an outer portion 17B. The inner portion 17A may include structure for the mounting the creaser wheel 17 on a rotational means for rotating the creaser wheel 17, while outer portion 17B contains the teeth 21 for creasing the facing material 1. As seen in FIG. 5A, the inner portion 17A may include one or more apertures for securing the creaser wheel to the rotational means. As seen the depicted embodiment, inner portion 17B includes a center aperture and three additional smaller apertures. The creaser wheel 17 could be mounted on the rotational means by fitting the apertures on a series of pegs projecting from the rotational means. Conventional securing means such as washers, nuts, etc. may be used to secure the creaser wheel 17 to the rotational means. It is noted that the creaser wheel 17 could be a single integral piece. Additionally, it is noted that the creaser wheel could be constructed from a metal, such as 400 stainless steel. Other metals and alloys could also be used as desired without straying from the spirit of the disclosure.

As seen in FIG. 5A, the depicted embodiment has 32 teeth. However, this is merely an illustrative embodiment and other quantities of teeth are considered within the scope of the disclosure. For example, according to some embodiments the number of teeth could be more (e.g., 48 or 64 teeth) or less (e.g., 16 or 24 teeth). It will be understood by those of ordinary skill in the art, that the dimensions of the notches 19, the dimensions of the teeth 21, and the number of teeth 21 can be configured to provide the above described percentages and ratios of creased portions and uncreased portions. For example, the notches 19 and the teeth 21 could be configured to provide the facing material 1 with a percentage of creased portions compared with the percentage of portions that are not creased of 50% to 50%. Of course, the notches 19 and the teeth 21 could be configured to provide other percentages and ratios as well. Similarly, the notches 19 and the teeth 21 can be configured to provide the above described uniform or non-uniform lengths of the creased and uncreased portions described above. For example, the notches 19 and the teeth 21 could be configured to provide the facing material 1 with creased portions of ⅛ inch and uncreased portions of ⅛ inch. Of course, the notches 19 and the teeth 21 could be configured to provide other lengths as well.

The dimensions of the notches 19 and teeth 21 along with the distance that the creaser wheel 17 is positioned from the facing material 1 will affect the depth of the crease or score line created in the facing material 1. The dimensions of the creaser wheel 17 and distance between the creaser wheel 17 and the facing material 1 should be configured so that the creases made in the facing material 1 facilitate folding of facing material, but at the same time the facing material 1 is not cut-through or severed. For example, if fiberglass mat, including a coated fiberglass mat, is used as the facing material, its thickness may range from approximately 10/1000 of an inch to 40/1000 of an inch. The notches 19 and teeth 21 of the creaser wheel 17 should be taken into account and the creaser wheel 17 should be positioned accordingly so that the fiberglass mat is not cut-through or severed. Similarly, if paper is used as the facing material its thickness may range from approximately 10/1000 of an inch to 20/1000 of an inch. Again, the notches 19 and teeth 21 of the creaser wheel 17 should be taken into account and the creaser wheel 17 should be positioned accordingly so that the paper is not cut-through or severed.

It is noted that each of the facing materials have different characteristics. For example, the depth of the crease on the fiberglass typically needs to be more shallow (or "lighter" than that on paper).

Another illustrative embodiment of a creaser wheel according to an aspect of the disclosure is shown at FIGS. 6A and 6B. As shown in FIGS. 6A and 6B, the illustrative creaser wheel 23 has notches 25 and teeth 27. As shown, the teeth 27 protrude from the circumference of the creaser wheel 23 and the notches 25 are defined by the teeth 27. As seen in the depicted embodiment, the teeth 27 exhibit a rounded, or scalloped, shape. Further, similarly to the previously described embodiment, the creaser wheel 23 may include an inner portion 23A and an outer portion 23B. The inner portion 23A may be directed to the mounting of the creaser wheel 23 on a rotational means for rotating the creaser wheel 23, while outer portion 23B contains the teeth 27 for creasing the facing material 1. As seen in FIGS. 6C-D, the inner portion 23A may be thicker than the outer portion 23B. Further, as FIG. 6E, the teeth 27 can exhibit a taper ($\theta$) and the taper can be approximately 30°. It is noted that according to at least some embodiments, the outside diameter of the creaser wheel can range from 4.25 inches to 4.5 inches and the thickness of the creaser wheel can ranges from 0.100 inches to 0.125 inches.

Figure 7A:
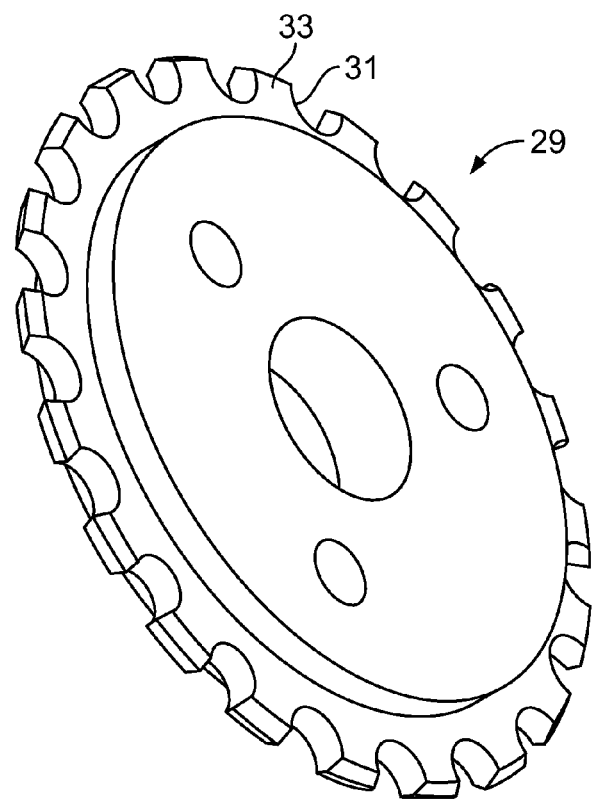
FIG. 7A is an illustrative embodiment of a creaser wheel according to an aspect of the present disclosure.
Figure 7B:
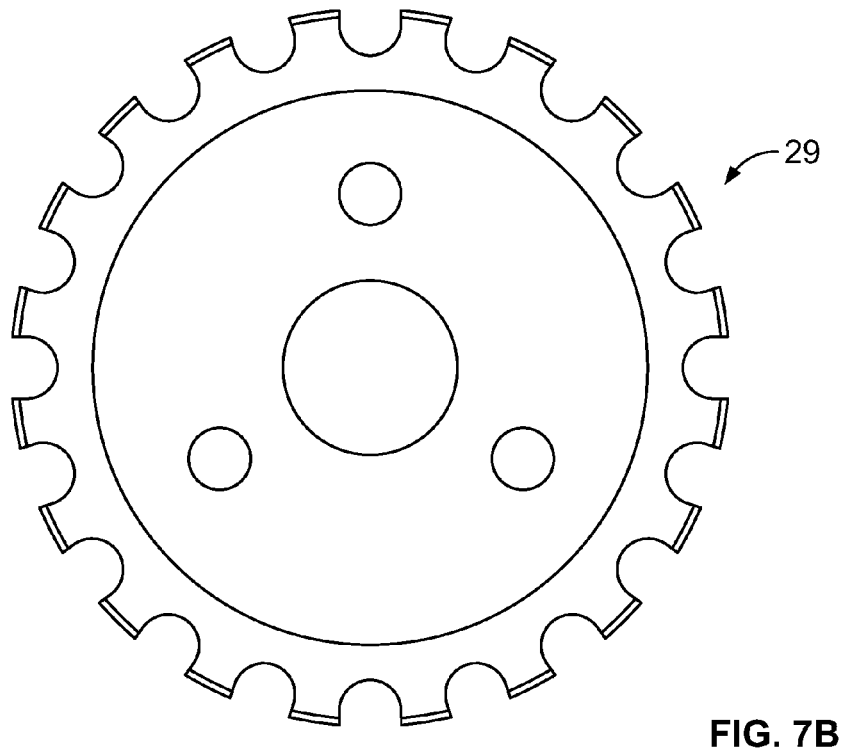
FIG. 7B is another view of the creaser wheel illustrated in FIG. 7A.

Another illustrative embodiment of a creaser wheel according to an aspect of the disclosure is shown at FIGS. 7A and 7B. As shown in FIGS. 7A and 7B, the illustrative creaser wheel 29 has notches 31 and teeth 33. This embodiment is similar to the embodiment shown in FIGS. 6A-E. However, the notches 31 have a rounded shape extending towards the center of the creaser wheel 29, while the teeth 33 are relatively rectangular. It is noted that these three embodiments are merely illustrative and should not be considered as limiting. Instead, they are provided merely to aid the reader in understanding and appreciating the disclosure. As long the creaser wheel can provide the ratios and the percentages of creased portions compared with the percentage of portions that are not creased which allow the facing material to be readily folded without significantly degrading the strength (i.e., helping to retain strength) of the facing material in the creased portion, the creaser wheels are considered within the scope of the disclosure.

Figure 8:
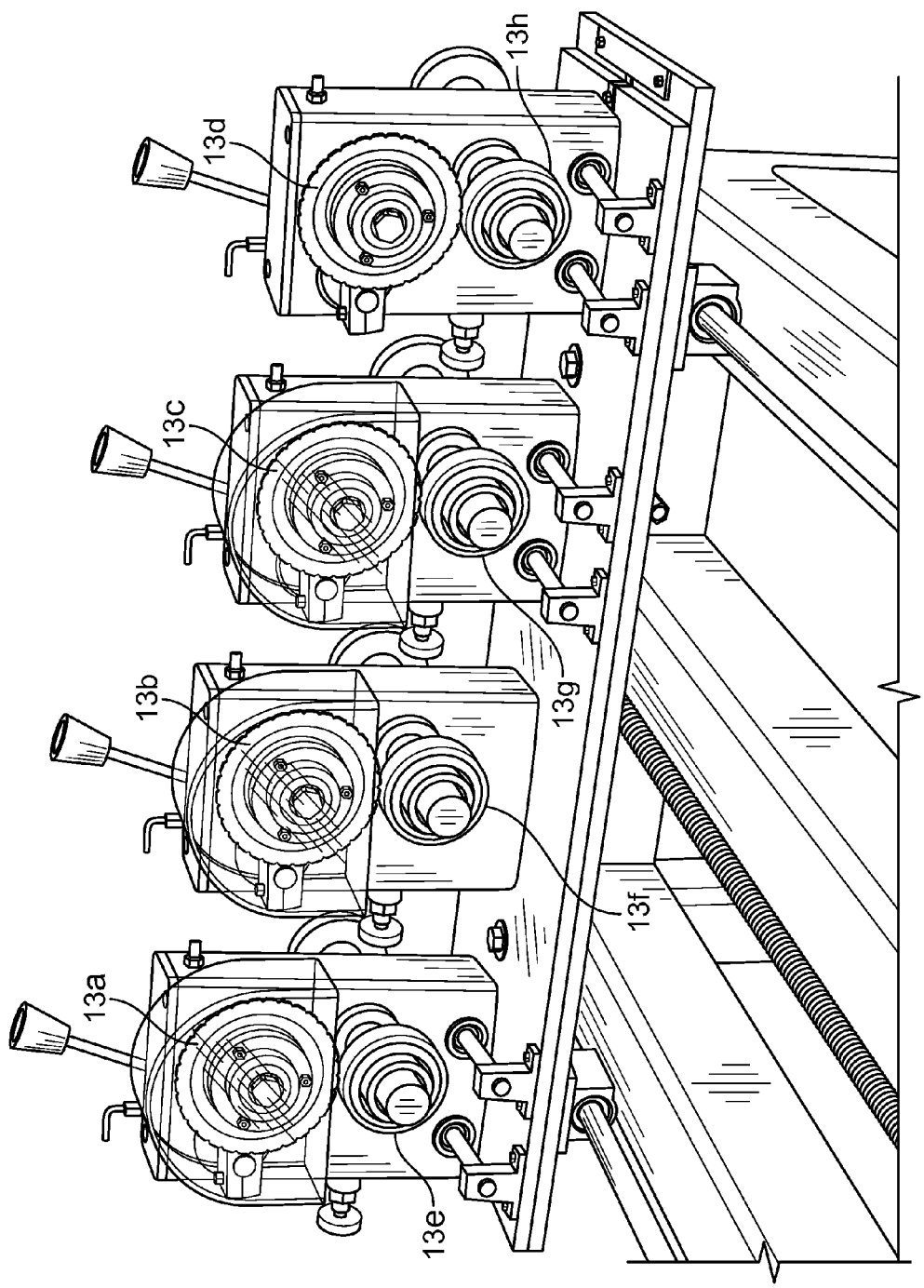
FIG. 8 illustrates a set of creaser wheels according to an aspect of the present disclosure.

FIG. 8 shows an illustrative embodiment of a set of four creaser wheels 13A-D positioned at one side of the facing material according to one aspect of this disclosure (it is noted that as shown in FIG. 9B, a corresponding set of four creaser wheels would be positioned on a second side of the facing material 1, but for simplicity only this first set of creaser wheels 13A-D will be discussed in detail). As seen in FIG. 8, respective anvils 13E-H are located below each creaser wheel 13A-D. The anvils are notched around their circumference in order to provide an overlap with the circumferential edge of the creaser wheel. Therefore, the facing material 1 being fed between the creaser wheels 13A-D and the anvils 13E-H is creased or scored in the overlap between the circumferential edge of the creaser wheels and the notched circumferences of the anvils. The anvils 13E-H may be mounted on low torque bearings so that they rotate along with the feeding of the facing material 1. This aids in preventing breaks in the facing material 1 as it is fed through the creasing area 11.

Figure 9A:
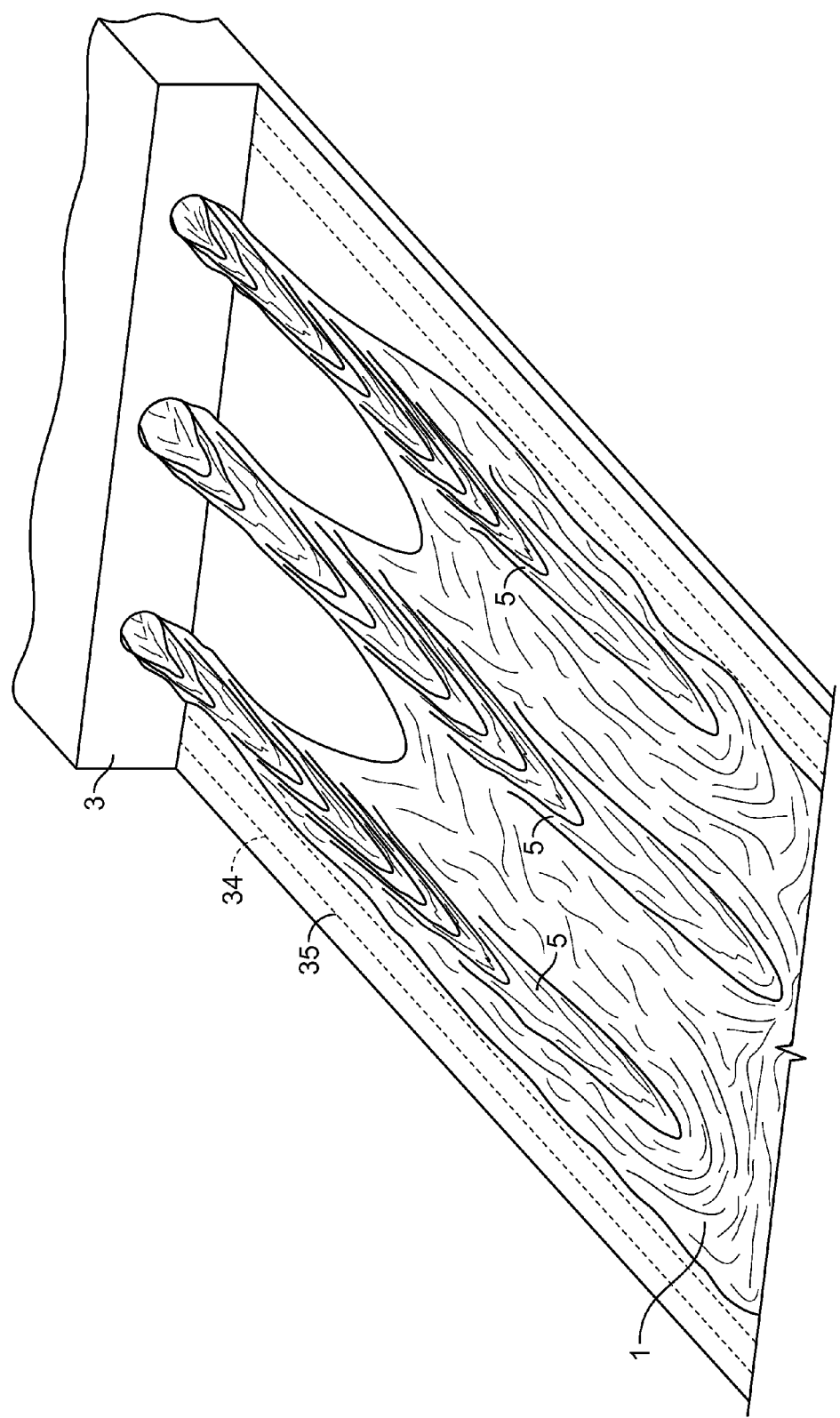
FIG. 9A is an illustrative embodiment of a facing material during a process for manufacturing wallboard where the facing material has been creased according to aspects of this disclosure.

The creaser wheels 13A-D may be positioned offset from each other in the width direction of the facing material 1 so that the creaser wheels 13A-D can create a series of parallel rows of creased portions and uncreased portions in the facing material 1. The series of parallel rows of creased portions and uncreased portions extend in a direction along a length of the first layer of facing material. The illustrative embodiment of FIG. 8 can make up to four parallel rows in the facing material 1 on one side of the facing material 1. FIG. 9A shows an illustrative embodiment of a facing material 1, wherein two parallel rows have been made on each side of the facing material 1. As seen in FIG. 9, the parallel rows each include a series of creased areas 34 and uncreased areas 35.

It is noted that while FIG. 8 shows creaser wheels 13A-D, other embodiments may have more or less creaser wheels depending on the type of wallboard to be manufactured. Further, not all the creaser wheels have to be used during a particular process. For example, while the illustrated embodiment of FIG. 8 includes four creaser wheels 13A-D, in order to manufacture the rectangular edge of the wallboard shown in FIG. 2A, only two of the four creaser wheels 13A-D are needed, because the embodiment shown in FIG. 2A requires only two folds. Therefore, in that situation, not all of the creaser wheels 13A-D would be used.

Further, it is noted that according to some aspects of this disclosure, the spacing of the creaser wheels will determine the thickness of the wallboard product 7. For example, if a particular wallboard product with a rectangular profile, as shown in FIG. 2A, is to be X feet wide and Y inches thick, then, as seen in FIG. 9B, the first crease (corresponding to position 9A shown in FIG. 2A) should be made approximately 0.5X feet from the center of the facing material 1, because as seen in FIG. 2A this first crease will define the edge of the wallboard 7. The second crease (corresponding to position 9B shown in FIG. 2A) should be made approximately Y inches from the first crease because as seen in FIG. 2A this second crease will define the thickness of the wallboard 7. As shown in FIG. 9B, the first and second creases should be made far enough away from the edge of the facing material 1 that enough facing material is left to create the top flap (corresponding to flap 9C shown in FIG. 2A) in order for the top facing material sheet 2 to be attached to the facing material 1. As discussed above, the thickness of the wallboard product will depend on the distance between the first and second creases. Hence, if the thickness of the wallboard product is ¼ inch, then the spacing between the first and second creases would be about ¼ inch. According to some illustrative embodiments of the disclosure, the wallboard can ¼, 5/16, 3/8, ½, and 1 inch thick. It should be noted that all the distances and dimensions discussed above are merely approximate. For example, the wallboard product 7 may contract upon being dried in the dryer station. Such contraction will obviously have to be taken into account in positioning the placement of the creases upstream.

It is noted that while some of the above disclosure discusses a fiberglass mat and coated fiberglass mat as the facing material, because of the fiberglass fibers' greater potential for breakage and cut-through compared with paper fibers, this should not be construed to mean that this process can not be applied to paper. In fact, even though paper fibers show a greater tendency to bend during the creasing process as the paper comes into contact with the creaser wheel, the paper is still weakened at the crease. Therefore, the method of intermittently creasing the facing material of the present disclosure will help the creased paper retain strength, just as it does with the fiberglass mat. Thus, even when applied to paper, this method will aid in preserving the integrity of the wallboard product 7 and preventing the facing material 1 which comprises the edge of the wallboard product 7 from separating (i.e., popping open) from the core of the wallboard product 7.

While the disclosure has been described with respect to specific examples including presently preferred modes of carrying out the disclosure, those skilled in the art will appreciate that there are numerous variations and permutations of the above described structures and methods. Thus, the spirit and scope of the disclosure should be construed broadly.

What is claimed is:

1. An apparatus for manufacturing wallboard comprising:
    a feeder that advances a first layer of facing material along a wallboard production line;
    a first set of one or more creaser wheels positioned along the production line adjacent a first edge of the first layer of facing material;
    a second set of one or more creaser wheels positioned along the production line adjacent a second edge of the first layer of facing material; and
    a feeding source along the production line that feeds a gypsum slurry onto the first layer of facing material,
    wherein each of the creaser wheels includes an alternating series of notches and teeth, each set of creaser wheels creating a series of uncreased and creased portions in a line in the first layer of facing material, and
    wherein the notches of each creaser wheel have an angle of approximately 120°.

2. The apparatus for manufacturing wallboard according to claim 1, further comprising:
    a second feeder for feeding a second layer of facing material along the wallboard production line;
    a folding apparatus which folds the creased first layer of facing material along creases created by the one or more creaser wheels;

a forming apparatus for attaching the second layer of facing material to the first layer of facing material over the slurry; and a drier for drying the gypsum slurry between the first and second layers of facing material.

3. The apparatus for manufacturing wallboard according to claim 1, wherein each of the creaser wheels in the first set of creaser wheels is offset from one another in a lateral direction across a width of the first layer of facing material, so that the first set of creaser wheels creates a first set of parallel lines of creased portions and uncreased portions extending in a first direction of the first layer of facing material, and further wherein each of the creaser wheels in the second set of creaser wheels is offset from one another in the lateral direction across the width of the first layer of facing material, so that the first set of creaser wheels creates a first set of parallel lines of creased portions and uncreased portions extending in a direction in the first direction of the first layer of facing material.

4. The apparatus for manufacturing wallboard according to claim 3, wherein each of the creaser wheels in the first and second set of creaser wheels are spaced apart by about ¼ inches to about 1 inch.

5. The apparatus for manufacturing wallboard according to claim 3, wherein each of the creaser wheels in the first and second sets of creaser wheels are spaced apart by about ½ inch to about 1 inch.

6. The apparatus for manufacturing wallboard according to claim 1, wherein each creaser wheel is configured to create creased portions comprising 30% to 90% of the line.

7. The apparatus for manufacturing wallboard according to claim 1, wherein the notches and teeth are configured to create individual creased portions and individual uncreased portions having an approximately equal length.

8. The apparatus for manufacturing wallboard according to claim 1, wherein each creaser wheel is configured to create creased portions comprising at least 50% of the line.

9. The apparatus for manufacturing wallboard according to claim 1, wherein each creaser wheel has a thickness ranging from 0.100 inches to 0.125 inches.

10. The apparatus for manufacturing wallboard according to claim 1, wherein each creaser wheel has an outside diameter from 4.25 inches to 4.5 inches.

11. The apparatus for manufacturing wallboard according to claim 1, wherein each creaser wheel comprises from 16 to 64 teeth.

12. The apparatus for manufacturing wallboard according to claim 1, wherein the teeth have a rounded shape.

13. The apparatus for making wallboard according to claim 1, wherein the teeth have a rectangular shape.

14. The apparatus for manufacturing wallboard according to claim 1, wherein each of the creaser wheels comprises an opposing anvil.

15. The apparatus for manufacturing wallboard according to claim 14, wherein the anvils comprise a notched circumference for receiving a circumferential edge of the respective creaser wheels.

16. The apparatus for manufacturing wallboard according to claim 1, wherein the notches and teeth of the creaser wheels are configured to provide creased portions having a length of $\frac{1}{64}$ to ½ inch.

17. The apparatus for manufacturing wallboard according to claim 1, wherein each creaser wheel has a taper (a) of approximately 6°.

18. The apparatus for manufacturing wallboard according to claim 1, wherein the teeth of each creaser wheel have a taper ($\Phi$) of approximately 30°.

19. The apparatus for manufacturing wallboard according to claim 1, wherein the facing material comprising a fiberglass mat or a coated fiberglass mat and the creaser wheels are dimensioned and positioned to prevent cut-through or severing of the fiberglass mat or the coated fiberglass mat.

20. The apparatus for manufacturing wallboard according to claim 1, further comprising a folding apparatus which folds the creased first layer of facing material along creases created by the one or more creaser wheels, after the gypsum slurry is fed onto the first layer of facing material.

* * * * *